Oct. 27, 1959 W. McCANDLESS ET AL 2,910,232
ODOMETER DRIVING MEANS
Filed May 1, 1953
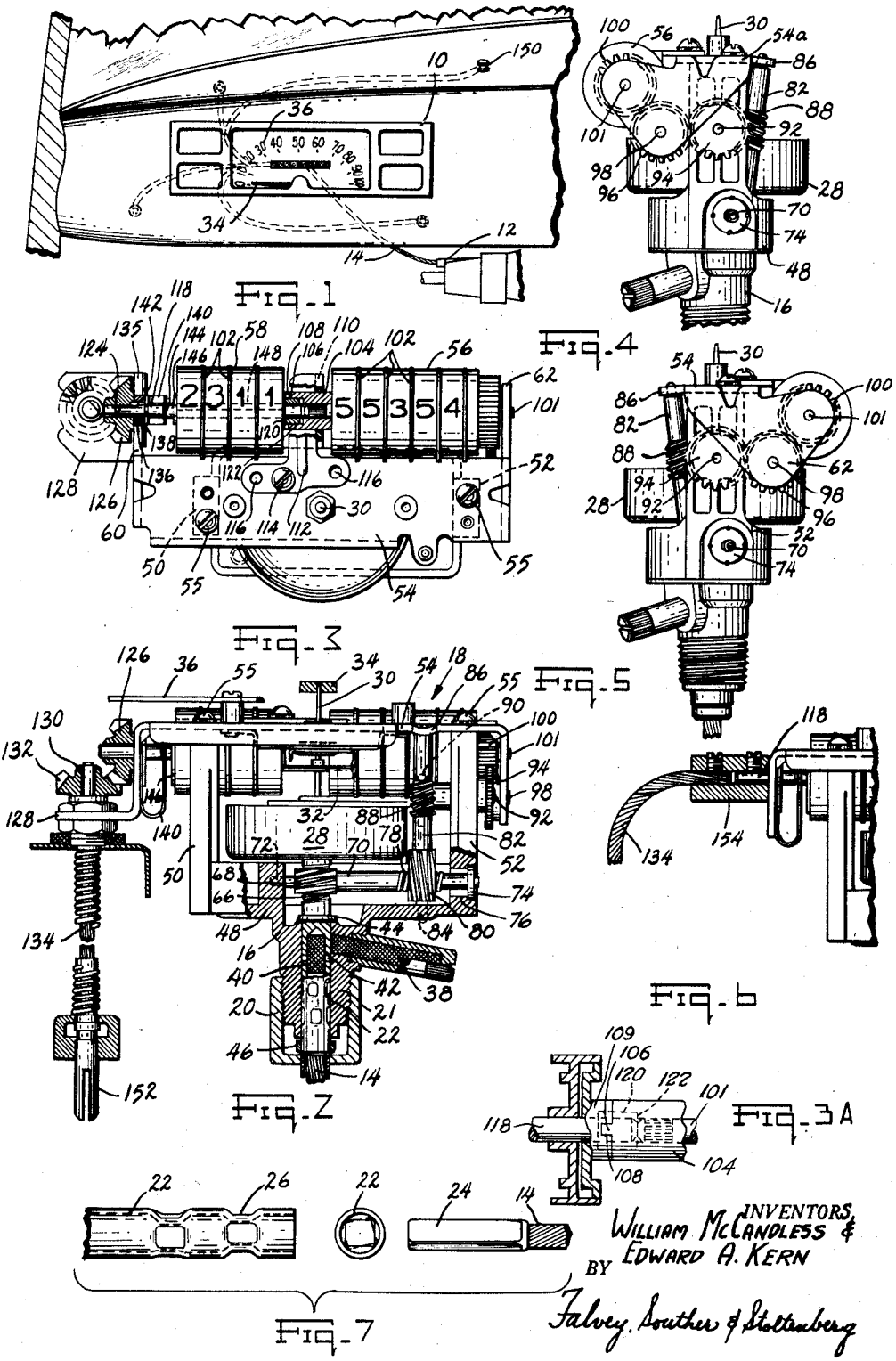
INVENTORS
WILLIAM McCANDLESS &
EDWARD A. KERN
BY
Falvey, Souther & Stoltenberg

United States Patent Office 2,910,232
Patented Oct. 27, 1959

2,910,232

ODOMETER DRIVING MEANS

William McCandless, Toledo, and Edward A. Kern, McClure, Ohio

Application May 1, 1953, Serial No. 352,352

1 Claim. (Cl. 235—97)

This invention relates to speedometers, more particularly to improvements in the driving structures for the moving parts of the speed indicating means and the odometer.

This application is a continuation-in-part of Serial No. 120,376, filed October 8, 1949, now abandoned.

The invention contemplates the provision of a simpler and cheaper means for driving the odometer by the flexible driven cable and to provide an improved manual resetting device.

The invention further contemplates the provision of an improved driving connection between the flexible driven cable and the rotating structure of the speed indicating means whereby friction and backlash are substantially reduced.

The invention further contemplates the provision of a manual reset device which allows zero resetting by a simple rotation of a member which preferably is flexible so as to allow the positioning of the manual knob at various locations on the dashboard of the automobile.

It is, therefore, a principal object of the invention to improve the driving and control conditions of a speedometer, which has a manual resettable odometer.

It is a further object of the invention to improve the driving connection between the driven flexible cable and the speedometer moving parts which is free from backlash and chatter and which has a minimum of friction.

It is a further object of this invention to provide a cheap and flexible construction for a speedometer which is capable of ready fabrication in a mass production line and which can readily be modified to be made suitable in varying operational conditions on different car models.

Other objects and advantages of this invention relating to the arrangement, operation and function of the related elements of the structure, to various details of construction, to combinations of parts and to economies of manufacture, will be apparent to those skilled in the art upon consideration of the following description and appended claim, reference being had to the accompanying drawings forming a part of this specification wherein like reference characters designate corresponding parts in the several views.

Fig. 1 is an elevational view of an automobile panel, showing the positions in which the manual knob of the odometer resetting device may be located;

Fig. 2 is an elevational view, partly in section, of the speedometer mechanism;

Fig. 3 is a plan view of the mechanism;

Fig. 3-A is an elevational view of a driving detail;

Figs. 4 and 5 are odometer details;

Fig. 6 is an elevational view, partly in section, of an alternate resetting means; and Fig. 7 is an exploded view of the driving connection between the flexible driving shaft and the speedometer mechanism.

Referring now to the drawings, particularly to Fig. 1, an instrument panel 10, including an instrument cluster of an automobile, is shown positioned before the operator thereof having a driving portion 12 in connection with the driving gear. A flexible cable 14 is rotated by the driving portion 12 in a sheath as is well known in the art. The flexible cable extends to the rear side of the instrument panel 10 where its sheath is affixed to the frame 16 of the speedometer device 18 by a threaded relation 20 on a boss 21 as is shown in Fig. 2. A driving relation between the cable 14 and a rotating hollow shaft 22 is attained by a squared portion 24 (Fig. 7) on the end of the cable cooperating with a squared socket 26 in the shaft 22 as will be described in detail hereinafter.

The rotating shaft 22 is journaled centrally in the boss 21, and is affixed to a rotating magnetic cup 28, on the interior of which is located a magnet (not shown) as is well known in the art. This arrangement cooperates with a speed cup positioned interiorly of the cup 28 to drive a shaft 30 against the bias of a hair spring 32 to move the speedometer pointer 34 which is affixed to the end of the shaft 30 with reference to a scale 36 as is best seen in Fig. 1. The details of construction of the speedometer are well known in the art and may be varied widely. These details have only a general relation to the present invention which is concerned with the driving shaft and with the odometer construction in combination with the speedometer as will be set forth in greater detail hereinafter.

Returning now to the hollow shaft 22 journaled in the boss 21, a wick oiler 38 is provided in the boss 21 to lubricate the shaft in its bearing, and, to further assure proper lubrication, an internal wick 40 is positioned in the upper end of the hollow portion of the shaft, which is also saturated with lubricant which is given egress through a transverse bore 42 to the external bearing surface of the shaft. The bearing of the shaft extends between a pair of shoulders 44 and 46 affixed to the shaft 22 cooperating with the end faces of the boss 21 to hold the assembly in fixed position to allow rotation of the cup 28 in a predetermined plane.

As has been pointed out, the driving relation between the flexible cable 14 and the hollow shaft 22 is obtained by a cooperative relation between a squared portion 24 on the cable 14 and a squared socket 26 in the shaft 22, preferably obtained by compressing inwardly the walls of the shaft. To prevent lost motion between these cooperating elements, the sockets 26 are provided in two longitudinally disposed positions with the sockets slightly rotated with respect to each other in such a manner as to cramp upon the straight sides of the squared portion 24 on the flexible cable 14. The sockets are preferably rotated about 15° with respect to each other, as is best seen in Fig. 7, which assures a firm grip between the parts when in cooperative relation and prevents "chocking," due to a small amount of lost motion. Such "chocking" has been the source of undesirable noises during operation of the speedometer device.

It will be noted that the frame of the speedometer consists of a base member 48 which is integral with the boss 21, a pair of pillars 50 and 52 and a bridge member 54 attached by screws 55 to the termini of the pillars. The pointer shaft 30 is journaled in the bridge member at one end and, at the other, in an internal bearing positioned in the end of the shaft 22 within the cup 28. Also mounted on the bridge member is a mileage odometer and a trip odometer 58, which are mounted with their shafts in aligned position journaled in depending side portions 60 and 62 of the bridge. The internal construction of the odometer is of a well known type and is described generally in Patent No. 2,004,881 and will not be described in further detail, except to say that the trip odometer of the speedometer disclosed in this patent, is driven by its shaft to which the first number wheel is affixed, which is changed in the device disclosed herein by substituting a novel driving arrangement in which the first number wheel is driven by the aligned shaft of the total mileage odometer, the driven number wheel being rotatably mounted on its supporting shaft. Means for the resetting of this trip odometer will be set forth in detail hereinafter.

In order to drive the mileage and trip odometers by the flexible cable 14, the hollow shaft 22 is provided with a worm 66, immediately above the collar 44 and below the cup 28, which cooperates with a gear 68 on a transverse shaft 70 journaled at one end in an aperture 72 in the base and at the other end in a place 74 positioned in an aperture 76 in the pillar 52, the aperture 76 being of sufficient size to allow insertion of the shaft longitudinally therethrough. The plate 74 is preferably stapled in position in the aperture against a shoulder therein.

Adjacent the pillar 52, the shaft 70 is provided with a worm 78 which is in driving cooperation with a gear 80 on an obliquely-extending vertically-disposed shaft 82, which is journaled at its lower end in an aperture 84 in the base 48 of the frame and at its upper end in an apertured ear 86 on the bridge member. At a central location, the vertically-disposed shaft 82 is provided with a worm 88, which is in driving relation with a gear 90 positioned on the inner end of a stub shaft 92 journaled in the pillar 52, having, on its outer end, a second gear 94 to be driven thereby. The second gear 94 drives an idler gear 96 journaled on a stud 98 positioned in the depending portion 62 of the bridge, which, in turn, is in driving relation with gear 100 affixed to the shaft 101 of the total mileage odometer 56 so as to drive the individual number wheels thereof to indicate the mileage traversed by the automobile. The gear ratio of the train is selected to give an accurate indication of this mileage and can be varied to suit the conditions of the driving gear as is well known in the art. The spacer plates 102 of the odometers, both mileage and trip, are notched and engage the adjacent edge of the bridge 54, to prevent accidental rotation of the number wheels, and to limit their rotation to the tens mechanism deriving its power from the gear train described.

The total mileage odometer shaft 101 terminates at a central location of the bridge member 54, and is serrated and fitted with a collar 104, the outer end of which is provided with tongues 106 which engage a slot 108 in the driver 109 for the tenths wheel of the trip odometer to drive the same. The collar 104 is journaled in an aperture in a depending lug 110 of a bracket 112 which is attached to the bridge 54 by means of screw 114 cooperating with locating lugs 116. By this means, the mileage odometer is positioned at its free end for rotation by the gear train, which also drives the trip odometer by means of the shaft 101, collar 104 and tongues 106 which engage slots in the interlocking driver for the first wheel of the trip odometer 58 to drive the same.

The adjacent end of the trip odometer shaft 118 is serrated and provided with a press fit collar 120 which fits into a counterbore 122 in the collar 104 and forms a journal for the shaft. The wall of the collar is provided with tongues 106, as already pointed out, which are exterior of the collar 120. The distal end of the trip odometer shaft 118 is truncated to provide a non-circular portion 124 which is fitted into a bevel gear 126 on the exterior of the depending lug 60 of the bridge member 54. The lug 60 is provided with a bent over portion 128 (Fig. 2) in which is journaled a short shaft 130 fitted into a second bevel gear 132 adjusted to cooperate with the first bevel gear 126, so that a turning moment, which is applied manually to a flexible cable 134, will be transmitted to the shaft of the trip odometer.

The distal end of the trip odometer shaft 118 is journaled in the lug 60, which is provided with a slotted aperture 135, having a circular central opening 136, into which is fitted a flanged bearing 138 to form the journal for the shaft. The shaft is positioned in the lug 60 from a lateral direction after its adjacent end is fitted into the collar 104, by entering the aperture 136 through its lateral slot 135. The bearing member 138 is then fitted into the central opening 136 with its flange resting on the inner side of the lug 60. The bearing assembly is then held in assembled relation by a U-shaped spring member 140 which has slotted apertures to lock into annular recesses 142 and 144 in the shaft 118. The bevel gear 126 is held on the end of the shaft 118 by its cooperative relation with the second bevel gear 132. The spring member 140 also has the function of maintaining the whole odometer assembly in position on the bridge member 54 cooperating with the central bracket 112 to attain this end. A second spring retainer 146 is used to hold the number wheels of the trip odometer in predetermined position on the shaft 118.

The gear train actuated by the flexible cable 14 drives the mileage odometer shaft 101 to move the number wheels thereof in accordance with the mileage traversed, and also the collar 104 which is affixed to the shaft. The collar 104 provides both a journal for the trip odometer shaft 118 through the agency of the collar 120 and a journal for the mileage odometer shaft 101 by its cooperative relation on its exterior with an aperture in the bracket 112. The tongues 106 on the end of the collar form the driving connection with the number wheels of the trip odometer by cooperating with the slot in the driving element of the first wheel. The shaft 118 of the trip odometer is manually rotatable by the flexible shaft 134, and when so rotated in a clockwise direction (viewed from left in Figs. 2 and 3) the resetting will not be affected. When, however, it is rotated in the counter-clockwise direction from the same standpoint, all of the number wheels in the trip odometer will be picked up by a longitudinal cam slot 148 with the same number on each wheel in alignment, so that the whole can readily be returned to the zero setting. The resetting can be quickly and efficiently brought about.

The details of construction of an odometer suitable for use with this invention, except the changes in the driving mechanism for the first number wheel of the trip odometer as pointed out above, are disclosed and described in Slye Patent No. 2,004,881, issued June 11, 1935.

By the use of the flexible resetting cable 134, the knob 150, adapted to be attached to the end 152 thereof, can be positioned in many different locations on the dashboard 10 of the automotive vehicle to which the device is attached, as is clearly shown in Fig. 1. Inasmuch as there is no engagement and disengagement required, a mere turning of the knob 150 in a counter-clockwise direction will reset the trip odometer.

As shown in Fig. 6, the bevel gears 126 and 132 can be dispensed with in installations where there is sufficient clearance behind the instrument panel and the flexible cable 134 connected directly to the protruding end of the shaft 118 by means of a locking collar 154 provided with set screws as shown. This materially cheapens and simplifies the resetting arrangements. In other respects, the device is the same as already described.

The device hereinbefore described has a further advantage, in that the frame member can be utilized in two different mounting arrangements wherein, firstly, the odometer opening 156 may be above the speedometer pointer shaft 30 as shown in Figs. 1 to 3 and Fig. 5, or, secondly, such opening may be below the shaft 30 as shown in Fig. 4. This may be brought about by changing the bridge construction 54a and by changing the position of the vertical shaft 82 to the opposite sides respectively from that shown in Fig. 5. A comparison of Figs. 4 and 5 clearly shows this change-over. This is advantageous in mass production, when both types must be made concurrently, in that the same base casting for the frame can be utilized in either type. The gear 80 is thus placed on the back side of the horizontal shaft 70 and the position of the journal 84 must be changed accordingly.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claim beyond the requirements of the prior art.

What is claimed:

In a device of the class described, a base member, a spindle adapted to be rotated in proportion to the speed of movement of a vehicle rotatably journaled on the base member, a gear train mounted on the base member adapted to be driven by the rotating spindle, a pair of fixed journals in aligned spaced relation positioned on the base member, a total mileage odometer having a shaft driven from an outer end by the gear train supported for rotation in one of the fixed journals, a resettable trip odometer having a shaft positioned in alignment with the shaft of the total mileage odometer and supported for rotation in the second fixed journal, a collar means affixed to the inner end of the shaft of the total mileage odometer distal from the gear drive end including means connected to and adapted to drive the first number wheel of the trip odometer, a bracket removably attached to the base member including an aperture to journal the collar means, said aperture being positioned in alignment with the two fixed journals to provide a support for the inner end of the total mileage odometer shaft, a bearing bore in the collar means to provide a supporting journal for the inner end of the trip odometer shaft and a resetting mechanism for the resettable trip odometer including a manual means affixed to the outer end of the trip odometer shaft.

References Cited in the file of this patent

UNITED STATES PATENTS

| | | |
|---|---|---|
| 1,110,835 | Stewart | Sept. 15, 1914 |
| 1,394,455 | Veeder | Oct. 18, 1921 |
| 1,408,598 | Jones | Mar. 7, 1922 |
| 1,461,956 | Wood | July 17, 1923 |
| 1,512,035 | Olsen | Oct. 21, 1924 |
| 2,004,881 | Slye | June 11, 1935 |

FOREIGN PATENTS

| | | |
|---|---|---|
| 508,084 | France | July 15, 1920 |
| 10,213 | Great Britain | 1914 |